United States Patent
Froman et al.

(10) Patent No.: US 7,604,202 B2
(45) Date of Patent: Oct. 20, 2009

(54) ICE MANAGEMENT SYSTEM FOR TILTROTOR AIRCRAFT

(75) Inventors: Gary S. Froman, Fort Worth, TX (US); Daniel R. Tippett, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 111 days.

(21) Appl. No.: 11/662,859

(22) PCT Filed: Feb. 24, 2005

(86) PCT No.: PCT/US2005/005854

§ 371 (c)(1),
(2), (4) Date: Mar. 14, 2007

(87) PCT Pub. No.: WO2006/093480

PCT Pub. Date: Sep. 8, 2006

(65) Prior Publication Data
US 2007/0257153 A1 Nov. 8, 2007

(51) Int. Cl.
*B64D 15/12* (2006.01)
(52) U.S. Cl. .............................. 244/134 D; 244/134 R
(58) Field of Classification Search ............ 244/134 R, 244/134 D, 134 F; 219/483, 494; 416/39; 60/39.093
See application file for complete search history.

(56) References Cited

U.S. PATENT DOCUMENTS

| | | | | |
|---|---|---|---|---|
| 2,393,635 A | * | 1/1946 | Hubbard | 244/134 A |
| 2,638,295 A | * | 5/1953 | Sheets | 244/134 D |
| 2,678,181 A | * | 5/1954 | Geyer et al. | 244/134 D |
| 3,002,718 A | * | 10/1961 | Hackenberger, Jr. | 244/134 R |
| 3,196,254 A | * | 7/1965 | Knoop | 219/486 |
| 3,657,514 A | * | 4/1972 | Adams | 219/201 |
| 4,292,502 A | * | 9/1981 | Adams | 219/483 |
| 4,410,794 A | * | 10/1983 | Williams | 219/486 |
| 4,638,960 A | * | 1/1987 | Straube et al. | 244/134 D |
| 4,690,353 A | * | 9/1987 | Haslim et al. | 244/134 D |
| 5,523,959 A | * | 6/1996 | Seegmiller | 702/130 |
| 6,753,513 B2 | * | 6/2004 | Goldberg et al. | 219/497 |
| 2006/0226292 A1 | * | 10/2006 | Houlihan et al. | 244/134 R |

\* cited by examiner

*Primary Examiner*—Michael Carone
*Assistant Examiner*—Philip J Bonzell
(74) *Attorney, Agent, or Firm*—James E. Walton

(57) ABSTRACT

An ice management system is configured for an aircraft having at least one rotor, each rotor having a plurality of blades. The system has an electrical power supply adapted to be carried by the aircraft remote from the rotor, and at least one heater is carried by the rotor for heating at least a portion of the rotor. A solid-state control relay is carried by the rotor and conductively coupled between the power supply and each heater for selectively controlling the flow of electrical power from the power supply to each heater. In addition, the system may incorporate a solid-state feed relay carried by the aircraft remote from the rotor and conductively coupled between the power supply and the control relay for selectively controlling the flow of electrical power to the control relay.

13 Claims, 9 Drawing Sheets

ICE MANAGEMENT SYSTEM FOR TILTROTOR AIRCRAFT

TECHNICAL FIELD

The present invention relates generally to the field of ice management systems and relates particularly to ice management systems for rotary-wing aircraft.

DESCRIPTION OF THE PRIOR ART

Tiltrotor aircraft have ice-buildup vulnerabilities that do not exist on either propeller-driven, fixed-wing aircraft or conventional helicopters. Compared to propellers, the prop-rotors of a tiltrotor are significantly larger in diameter and rotate more slowly, creating lower centrifugal forces. Higher centrifugal forces tend to cause ice that forms on the blades of a propeller to shed, whereas the lower forces of prop-rotors may allow for more ice buildup on the blades. Also, lift for a tiltrotor is generated by prop-rotors having a smaller diameter than the rotor assembly on a conventional helicopter, so prop-rotors need to be more efficient at producing lift. Ice accumulation greatly reduces prop-rotor lift efficiency, and, because of the prop-rotor diameter and aircraft weight ratio, tiltrotors are significantly affected in their ability to land or hover by ice accumulation on the blades of the prop-rotor.

Another significant difference between tiltrotors and helicopters is that ice shed by a prop-rotor may be slung against the fuselage while the tiltrotor is operating in airplane mode. Therefore, the management of ice shedding on tiltrotors must rely on an accurate control system that is capable of allowing sufficient ice accumulation to obtain a clean shed without allowing over-accumulation, which could potentially cause fuselage damage when the ice is shed.

SUMMARY OF THE INVENTION

It is one objective of the present invention to provide an ice management system for a tiltrotor aircraft, the system having improved performance and reliability.

The above objects are achieved by providing an ice management system for a tiltrotor aircraft, the system having improved performance and reliability.

An ice management system is configured for an aircraft having at least one prop-rotor, each prop-rotor being an assembly having a plurality of blades. The system has an electrical power supply adapted to be carried by the aircraft remote from the prop-rotor, and at least one heater is carried by the prop-rotor for heating at least a portion of the prop-rotor. At least one solid-state control relay is carried by the prop-rotor and conductively coupled between the power supply and each heater for selectively controlling the flow of electrical power from the power supply to each heater. In addition, the system may incorporate at least one solid-state feed relay carried by the aircraft remote from the prop-rotor and conductively coupled between the power supply and the control relay for selectively controlling the flow of electrical power to the control relay. The system may also incorporate current sensors, such as current transformers, to monitor the amount of current supplied to the heaters, allowing for detection and isolation of faults in the system.

The present invention provides an ice management system with many advantages, including: (1) a reduction in weight; (2) a reduction in volume for the control units of the system; (3) a reduction in cost of the system; (4) improved reliability; and (5) improved fault detection and isolation.

Additional objectives, features, and advantages will be apparent in the written description that follows.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

Figure 1:
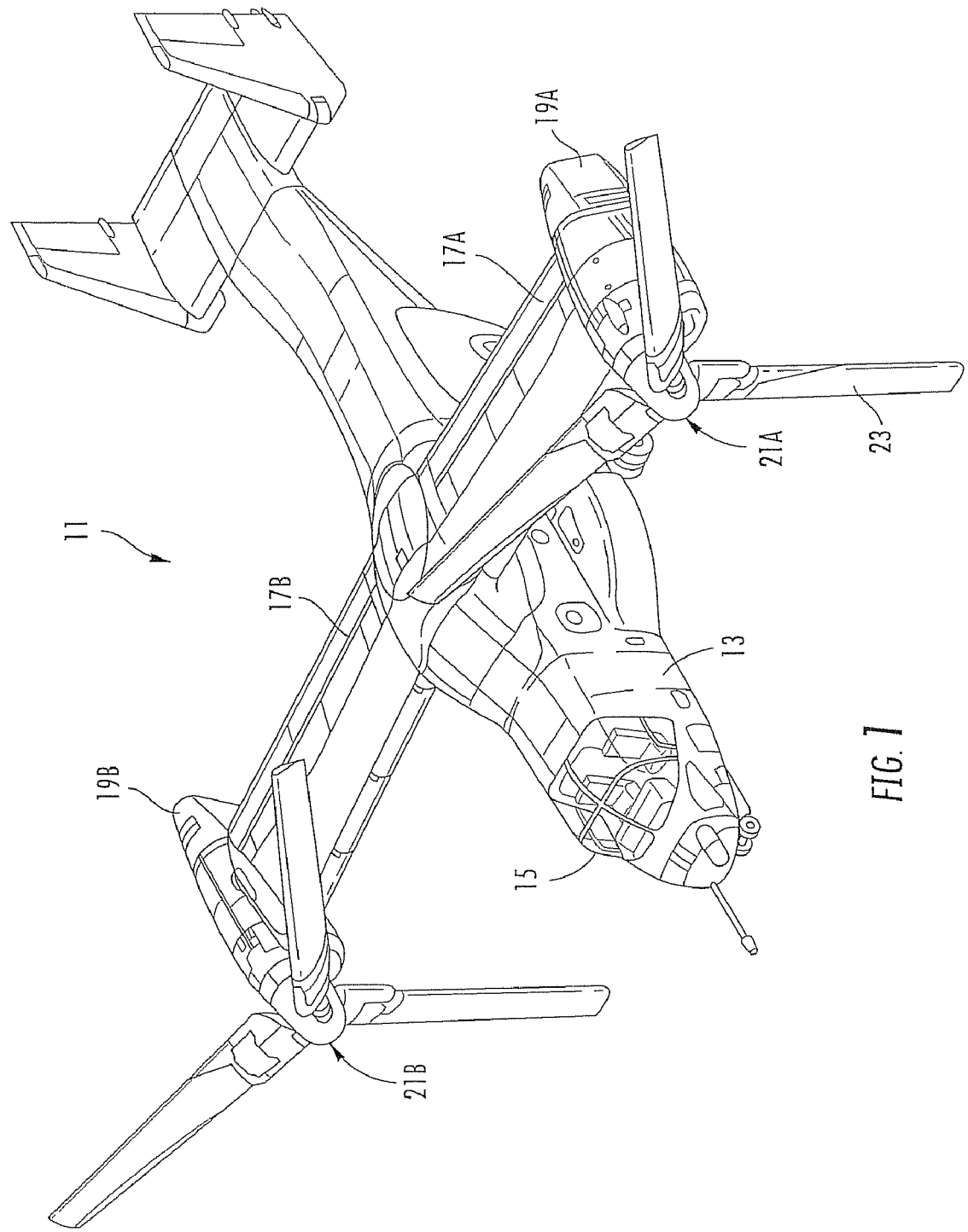
FIG. 1 is a perspective view of a tiltrotor aircraft having an ice management system according to the present invention.

The present invention is an ice management system for prop-rotors of tiltrotor aircraft that is effective, reliable, rugged, and lightweight, and which has a relatively low cost. Reliability is a key requirement for an ice management system on a tiltrotor to avoid dangerous ice accumulation on the prop-rotor blades and the corresponding loss of lift.

A combination of electro-thermal prop-rotor de-ice zones and leading edge parting strip anti-ice zones achieve the required control of prop-rotor ice shedding while minimizing the size and weight of shed ice. The system consists of multiple electro-thermal heating elements on each blade of each prop-rotor, control relays carried by the prop-rotors, feed relays carried remote from the prop-rotors, and a controller for controlling operation of the control relays and feed relays. The system uses solid-state relays for at least the control relays, and solid-state relays are preferably also used for the feed relays. At least two relay connections in series are used for all electro-thermal heating components, so that there are always at least two ways to disconnect power to the heating elements. This is important in the case that a relay was to short "on," which could cause overheating of a blade surface or overloading of the electrical system of the aircraft.

The system of the present invention solves problems experienced with previous ice management systems for tiltrotor aircraft. Some of these problems were a result of the harsh environment experienced by electronic components, especially when they are installed in rotating aircraft assemblies. In the system of the invention, 4 electronics boxes are mounted in each prop-rotor, and this is an environment of high vibration and high centrifugal-force loads. By utilizing solid-state relays in the components of the ice management system, the reliability of the system is increased, as well as providing for the ability to enhance fault detection and isolation. The system of the invention provides a simple open/ground control to each solid-state relay, and this approach is very rugged and simple, requiring fewer electronic components than would be used with a serial or other data connection. The use of solid-state relays allows for fault detection through switching of the relays in a selected sequence before and/or after each operation of a component, whereas use of mechanical contactor-type relays in this manner would significantly decrease their operational life.

An additional advantage of the system of the invention is that only six high-power electrical connections to each prop-rotor are necessary to control the flow of electrical power to components within the corresponding prop-rotor, which is possible because the switching is done with the solid-state relays carried within the prop-rotor. This allows use of a slip ring, or similar connector for rotating devices, having only six high-current contact rings, eliminating the need for multiple electrical and data connections for operation of each component carried on the prop-rotors.

FIG. 1 shows a tiltrotor aircraft 11 equipped with an ice management system according to the present invention. Aircraft 11 has a fuselage 13 with a cockpit 15 located in a forward portion of fuselage 13. Wings 17A, 17B are attached to fuselage 13, and an engine nacelle 19A, 19B is rotatably attached to the outer end of each wing 17A, 17B, respectively. Each nacelle 19A, 19B houses an engine (not shown), which is operably connected to a rotatable prop-rotor 21A, 21B. Each prop-rotor 21A, 21B comprises three blades 23. Prop-rotors 21A, 21B rotate in opposite directions and comprise similar components, though components in prop-rotors 21A, 21B may be constructed and/or installed in a mirror, or reverse, manner from the opposite prop-rotor 21A, 21B. The following description will describe the ice management system as it is installed in one of prop-rotors 21A, 21B and nacelles 19A, 19B, referred to as prop-rotor 21 and nacelle 19, though it should be understood that the description is applicable to both installation on both sides of aircraft 11.

Figure 2:
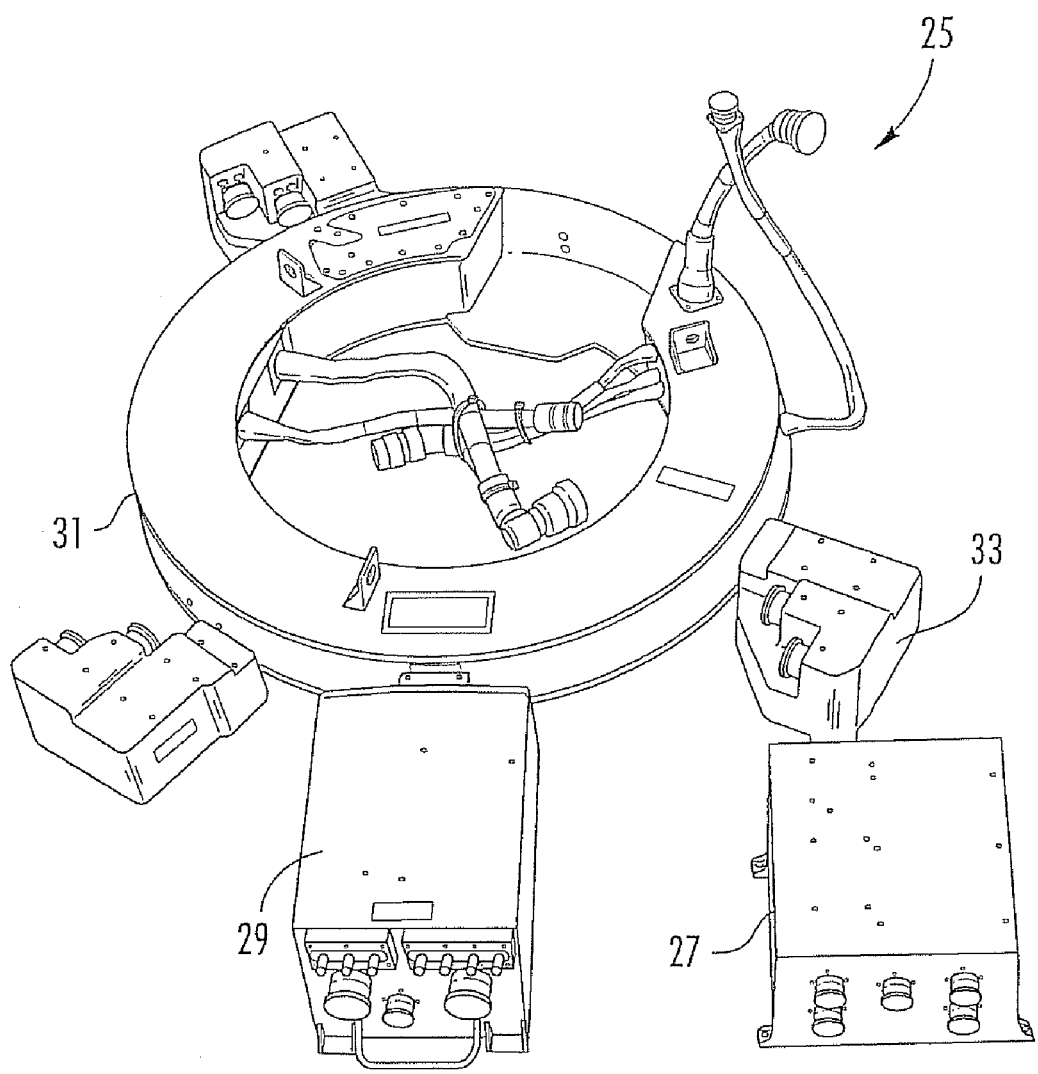
FIG. 2 is a perspective view of uninstalled components of an ice management system according to the present invention and configured for installation on the tiltrotor aircraft of FIG. 1.
Figure 3:
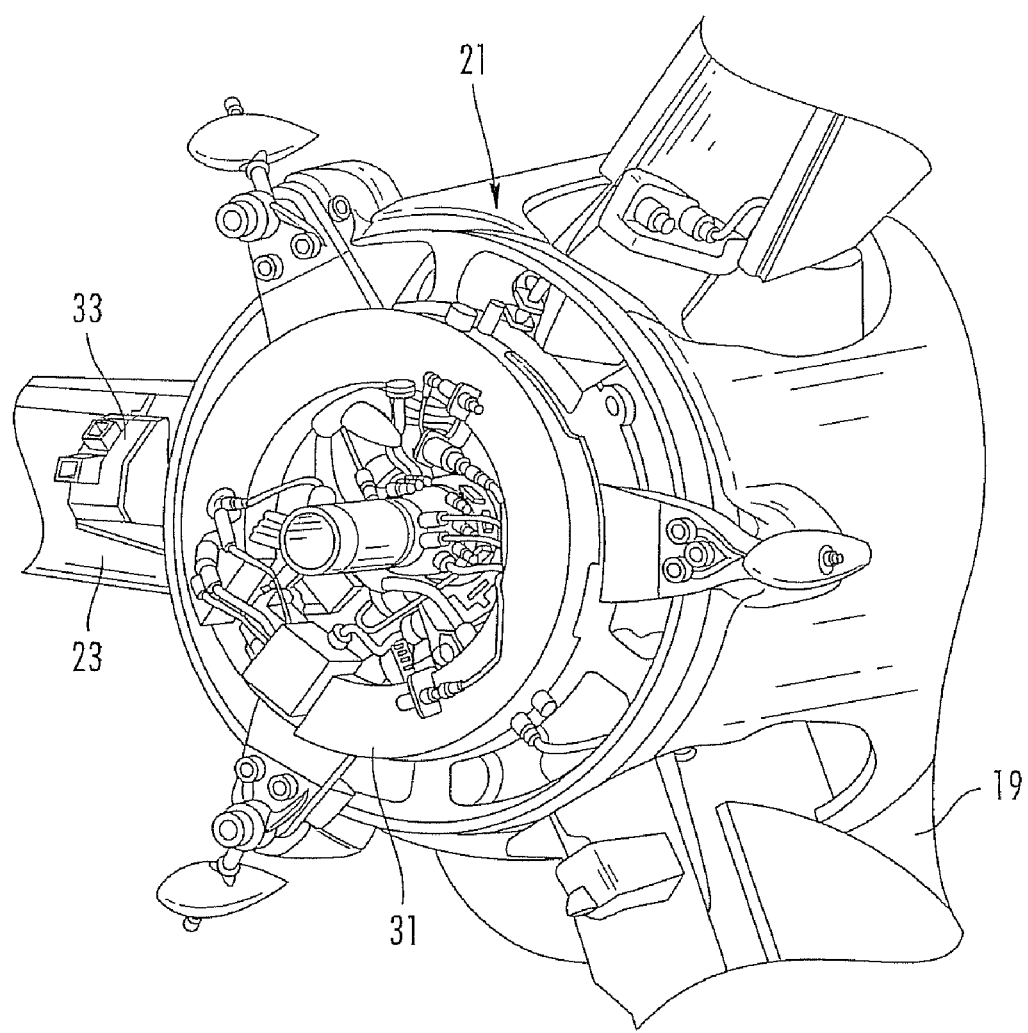
FIG. 3 is a perspective view of a portion of the aircraft of FIG. 1, the figure showing components of the ice management system according to the invention installed on a prop-rotor.

FIG. 2 shows components of ice management system 25. A master controller 27 is located in cockpit 15 (FIG. 1) for providing a pilot the ability to selectively control the operation of system 25. A nacelle control unit (NCU) 29 is mounted within each nacelle 19 and is operably connected to controller 27. The rotating components include a central de-ice distributor (CDD) 31, which is carried in a central portion of each prop-rotor 21, and three blade de-ice distributors (BDD) 33, one mounted in each blade 23 of each prop-rotor 21. As is further described below, NCU 29 houses multiple relays for switching the flow of electrical power to the rotating components of system 25. In addition, each CDD 31 and BDD 33 houses additional relays for controlling the flow of electrical power through ice-control devices located on prop-rotor 21. FIG. 3 shows CDD 31 and each BDD 33 installed in prop-rotor 21, with one BDD 33 installed in the root portion of each blade 23 and CDD 31 installed coaxially with prop-rotor 21.

Controller 27 and each NCU 29 house computer-based electronics for operating system 25 in accordance with control input from a crewmember seated in cockpit 15 and with selected modes of operation implemented by software operating within the electronics of controller 27 and each NCU 29. Controller 27 communicates serially with controller 29, which operates components of system 25 mounted in both nacelles 19 and prop-rotors 21, though only one prop-rotor set is shown in the figure. In addition, controller 27 preferably controls the operation of other ice-protection devices, such as those located on wings 17A, 17B, cockpit windshields, and other aircraft components, such as a pilot tube (not shown).

Figure 4:
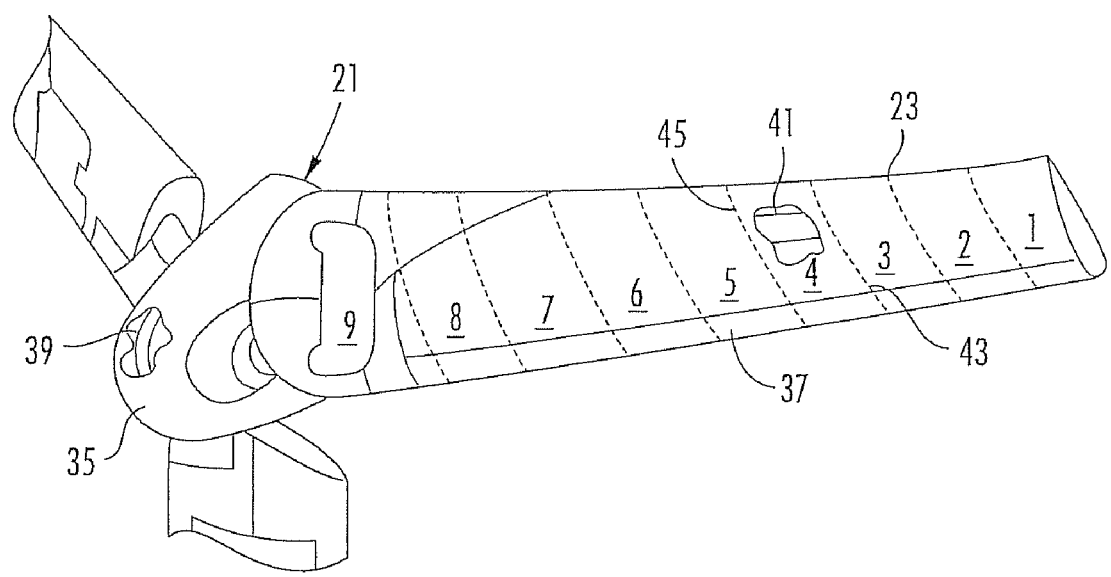
FIG. 4 is a perspective view of a portion of the prop-rotor of FIG. 3, the figure showing additional components of the ice management system according to the invention.

FIG. 4 illustrates a portion of prop-rotor 21, with blades 23 extending radially from a central portion covered by a spinner 35, which is an aerodynamic housing covering the central portion. In the preferred embodiment of the invention, three types of ice-control devices are carried on prop-rotor 21.

A parting strip 37 is located on the leading edge of each blade 23, each parting strip 37 being formed of metal and capable of being heated using electrical power conducted through parting strips 37. Heating of parting strip 37 causes melting of ice that forms on the leading edge of blades 23, and the partially melted ice peels away due to the aerodynamic forces caused by the impinging air as prop-rotor 21 rotates.

A second ice-control device comprises three sets of electro-thermal heating elements 39 embedded in spinner 35, elements 39 being visible in FIG. 4 in the cutaway portion of spinner 35. Heating elements 39 are heated by electrical power conducted through heating elements 39, and heat energy is transferred across the surface of spinner 35, preventing ice from forming on spinner 35 or at least partially melting ice already formed on spinner 35.

The third type of ice-control device carried in prop-rotor 21 is electro-thermal heating elements 41 carried in blades 23, elements 41 being visible in the cutaway portion of blade 23. Each blade 23 is divided into heating zones, indicated in the figure by dotted lines extending chordwise across blade 23. For example, zone 4 is located radially outward on blade 23 between dotted lines 43 and 45. Each heating zone has a separate set of heating elements 41 for heating that portion of blade 23, such that elements 41 in each zone may be operated independently of elements 41 in other zones on the same blade 23. The same zone is operated simultaneously on all three blades 23 of a prop-rotor 21 to avoid imbalance caused by different amounts of ice accumulated on each of the three blades 23. In the embodiment shown, blade 23 is divided into nine heating zones, though each blade 23 may be divided into more or fewer zones.

Figure 5:
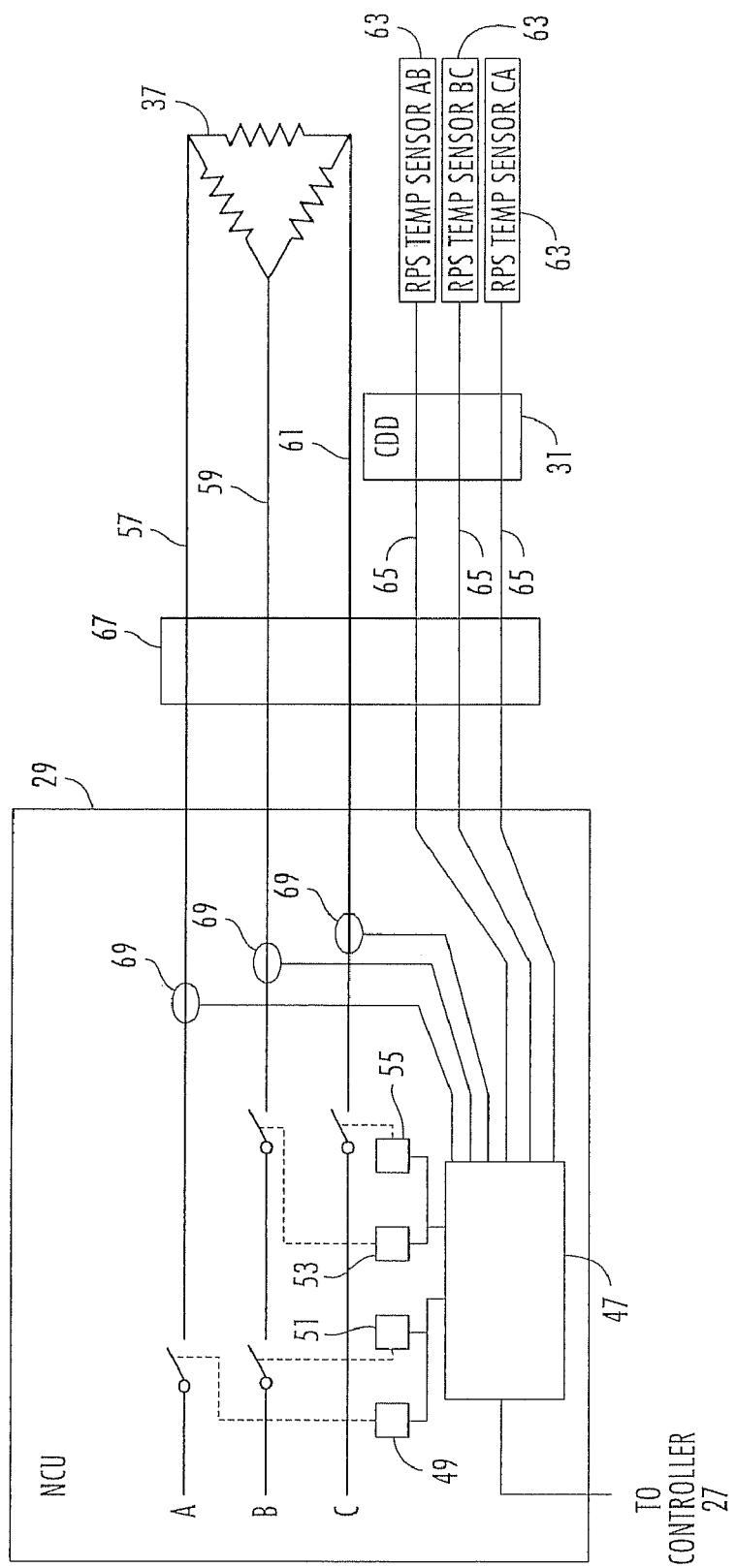
FIG. 5 is a schematic of a portion of the control system of the ice management system according to the invention, the portion controlling heating of the parting strip of the corresponding prop-rotor.
Figure 6:
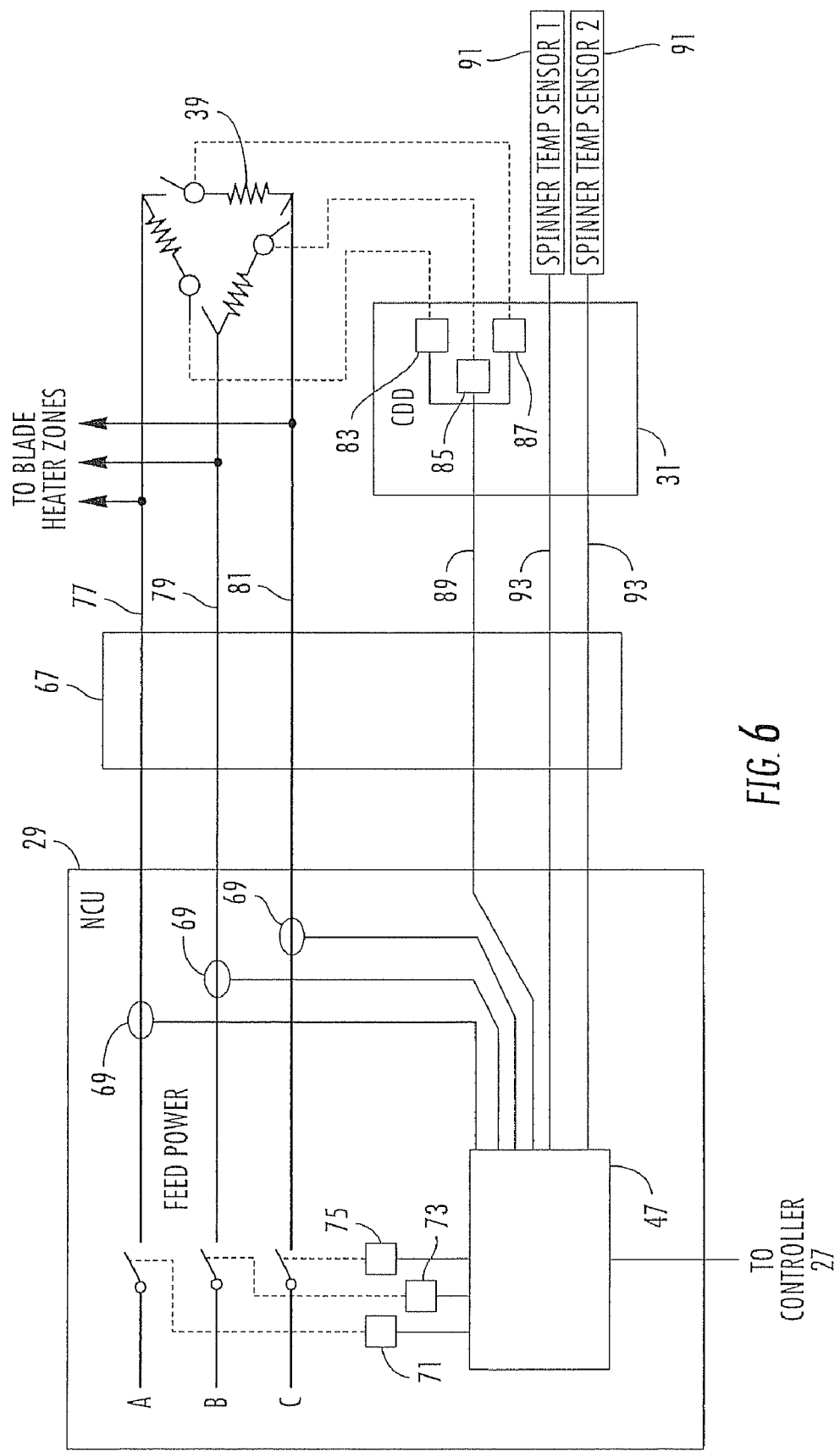
FIG. 6 is a schematic of a portion of the control system of the ice management system according to the invention, the portion controlling heaters in the spinner of the corresponding prop-rotor.
Figure 7:
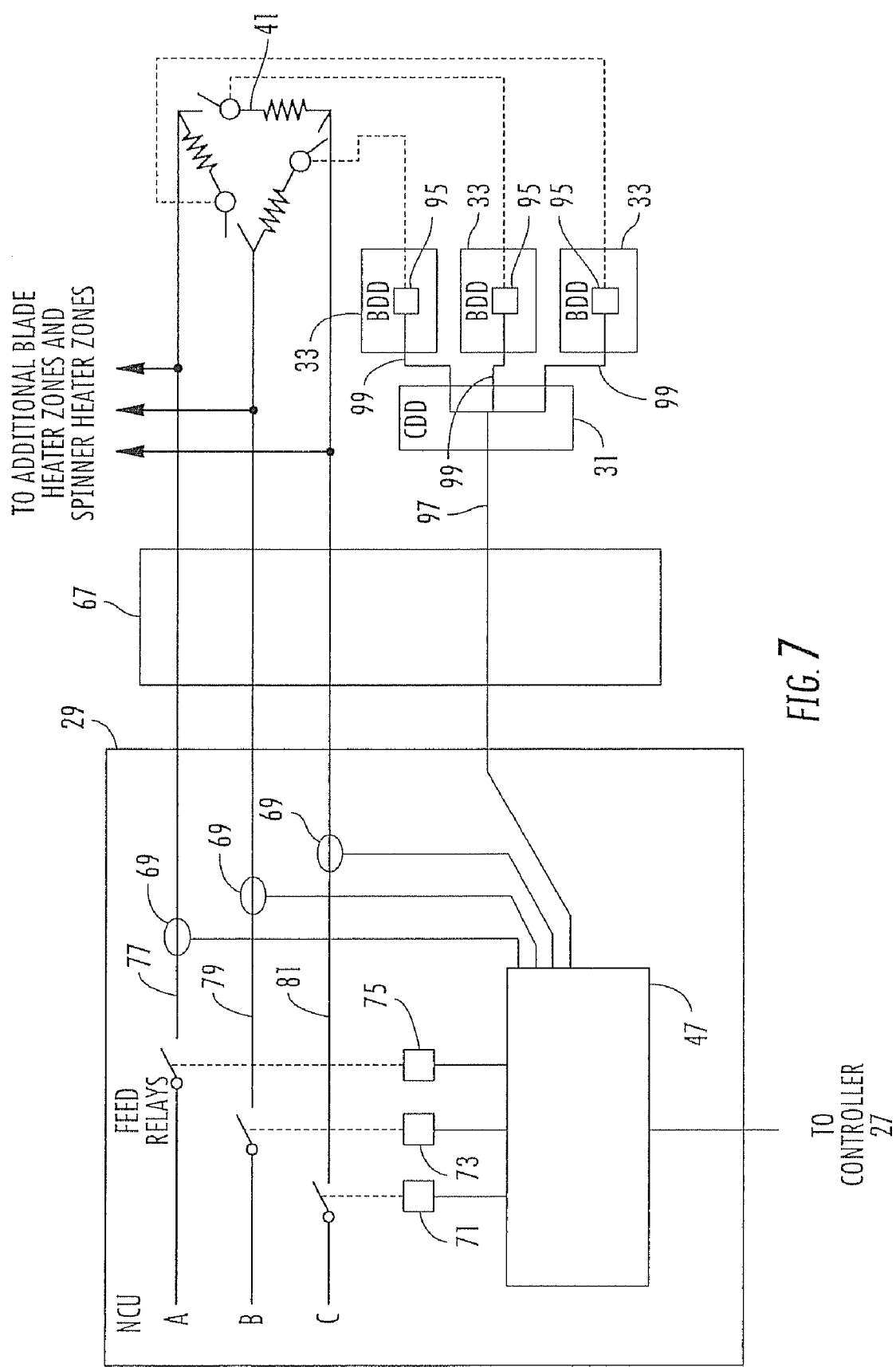
FIG. 7 is a schematic of a portion of the control system of the ice management system according to the invention, the portion controlling heaters in a heating zone of the blades of the corresponding prop-rotor.

FIGS. 5 through 7 are schematic diagrams of the electrical connections between components of the system of the invention. In FIG. 5, a schematic view shows the control system for operation of each parting strip 37. NCU 29 houses a computer-based controller 47 and feed relays 49, 51, 53, 55, each feed relay 49, 51, 53, 55 being a solid-state relay controlling the flow of electrical power to parting strip 37 on a blade 23 (not shown). In response to manual commands from an operator to operate parting strip 37, controller 27 signals controller 47 to begin operation, and controller 47 energizes feed relays 49, 51, 53, 55, allowing electrical power to flow through electrical conductors 57, 59, 61 to parting strip 37. Three parting-strip temperature sensors 63 sense temperatures of areas in and/or near parting strip 37 and generate signals that are relayed on cables 65 through CDD 31 to controller 47 in NCU 29. Controller 47 uses these signals to regulate the temperature of parting strip 37 to within a predetermined temperature band by selectively providing power to parting strip 37 through operation of relays 49, 51, 53, 55.

A slip ring assembly 67 is used to provide electrical connections between components of system 25 on each prop-rotor 21 (not shown) and the non-rotating components of system 25. Slip ring 67 is preferably a type well known in the art, such as a slip ring having non-rotating brushes conductively coupled to one side of each connection and slidingly engaging rotating rings that are conductively coupled to the other side of each connection. Slip ring 67 may alternatively be of other appropriate types known in the art.

Each feed relay 49, 51, 53, 55 provides control over one phase of the 3-phase electrical power used to operate parting strip 37, with feed relays 51 and 53 both controlling the same phase. Feed relays 49, 51, 53, 55 are each a solid-state, single-pole relay, and the dotted lines in the figure show the contact controlled by each feed relay 49, 51, 53, 55. For example, feed relay 49 controls the flow of current through conductor 57, whereas both of feed relays 51 and 53 control flow through conductor 59. Feed relay 55 controls the flow of current through conductor 61. As indicated in the figure, feed relays 49, 51 are connected to controller 47 so as to be switched together. Likewise, feed relays 53, 55 are switched together by controller 47. Though these pairs are switched together, it is preferred that feed relays 49, 51, 53, 55 provide for zero-cross switching, in that the pole is not thrown until the waveform of the current reaches zero. Because of the different phase angles of the current in each conductor 57, 59, 61, the poles in each pair will be thrown at slightly different times.

Fault detection and isolation is provided for by measuring the currents in conductors 57, 59, 61 when the pairs of feed relays 49, 51, 53, 55 are in selected states. The current in each conductor 57, 59, 61 is sensed using a sensor 69, such as current transformer, and the signal generated by each sensor 69 is relayed to controller 47 to determine whether the amount of current falls within expected or acceptable ranges. For example, too much or too little current may indicate a short in one of conductors 57, 59, 61 or a problem in parting strip 37. Because the three parting strips 37 on a proprotor 21, with one on each of the three blades 23, are conductively connected in a "delta" arrangement, as shown in the figure, the signals generated from sensors 69 can also be used to determine the current in each leg of the delta configuration. This allows for detection of a fault in an individual leg of the delta, and the preferred method of calculating the leg currents is described below.

To ensure redundant ability to control operation of parting strip 37, the pairs of feed relays 49, 51, 53, 55 are energized in a selected sequence before and/or after each operation of parting strip 37. When only one pair of feed relays 49, 51, 53, 55 is energized, sensors 69 should sense little or no current in conductors 57, 59, 61, whereas a sensed current indicates that at least one of the other pair of feed relays 49, 51, 53, 55 is maintaining contact when de-energized. When this occurs, all feed relays 49, 51, 53, 55 are de-energized to prevent overheating of parting strip 37 or surrounding areas of blade 23.

In the preferred embodiment, a first pair of feed relays 49, 51, 53, 55 is energized prior to operation of parting strip 37 while the second pair remains de-energized. If no current is sensed in conductors 57, 59, 61 when the first pair is energized, then controller 47 energizes the second pair to begin normal operation of parting strip 37. When controller 47 ceases operation of parting strip 37, the first pair of feed relays 49, 51, 53, 55 is de-energized while the second pair remains energized, and no current should be sensed in conductors 57, 59, 61.

Feed relays 49, 51, 53, 55 are energized during operation of parting strip 37, and controller 47 maintains a supply of power to parting strip 37 until an upper temperature of the selected control band is reached. The control band is preferably scheduled for ambient conditions and/or the current flight profile (airspeed, etc.) of aircraft 11. During operation of parting strip 37, the current in conductor 57, 59, 61 should remain within a selected range of values. For example, the selected nominal range may be approximately 14.4 to approximately 21.3 amps, though the range may be any appropriate values for the given application. If the current in any conductor 57, 59, 61 is below this range during operation, then an under-current fault is detected, and feed relays 49, 51, 53, 55 are de-energized to stop operation of parting strip 37. This condition may indicate an inappropriate load in parting strip 37 or an open circuit in conductors 57, 59, 61. Likewise, if a current above this range is detected, feed relays 49, 51, 53, 55 are de-energized to avoid overheating of parting strip 37 or the surrounding areas of blade 23 or overloading the electrical system of aircraft 11. This condition might indicate a short circuit in parting strip 37 or conductors 57, 59, 61.

FIG. 6 is a schematic view of the control system for heating elements 39 in the three heating zones within spinner 35. As shown, NCU 29 also houses feed relays 71, 73, 75, which control the flow of electrical current through conductors 77, 79, 81, respectively, to heating elements 39 and to heating elements 41 in blades 23 (see FIG. 7). Feed relays 71, 73, 75 are each preferably a solid-state, single-pole relay. The three zones of heating elements 39 are conductively connected in a delta arrangement and solid-state, single-pole control relays 83, 85, 87 are carried in CDD 31 for providing switching control of each leg of the delta configuration, the switching being done within prop-rotor 21. During operation, feed relays 71, 73, 75 are switched individually, whereas control relays 83, 85, 87 are switched together by commands sent from controller 47 to CDD 31 through cable 89. Spinner temperature sensors 91 are carried on spinner 35 for sensing temperatures of selected areas of spinner 35 and generate signals that are relayed on cables 93 through CDD 31 to controller 47 in NCU 29. Controller 47 uses these signals to regulate the temperature of spinner 35 to within a predetermined temperature control band. The rotating and non-rotating portion of conductors 77, 79, 81 and cables 89, 93 are conductively coupled through slip ring 67.

Fault detection and isolation is provided for by measuring the currents in conductors 77, 79, 81 when feed relays 71, 73, 75 and control relays 83, 85, 87 are in selected states. The current in each conductor 77, 79, 81 is sensed using a current sensor 69, and the signals generated by sensors 69 are relayed to controller 47 to determine whether the amount of current falls within expected or acceptable ranges.

To ensure redundant ability to control operation of heating elements 39, feed relays 71, 73, 75 and control relays 83, 85, 87 (switched together) are alternately energized in combinations of relay states during power-up of system 25. When only one of feed relays 71, 73, 75 is energized and all of control relays 83, 85, 87 are de-energized, sensors 69 should sense little or no current in conductors 77, 79, 81. A sensed current will indicate that there is a short in one of conductors 77, 79, 81 and/or one of the remaining feed relays 71, 73, 75 is maintaining contact when de-energized.

Before and/or after each operation of heating elements 39 during normal operation of system 25, all of feed relays 71, 73, 75 are switched together, as are control relays 83, 85, 87. When feed relays 71, 73, 75 are energized and control relays 83, 85, 87 are de-energized, little or no current should be sensed in conductors 77, 79, 81. Likewise, control relays 83, 85, 87 are energized and feed relays 71, 73, 75 are de-energized, little or no current should be sensed in conductors 77, 79, 81. If current is sensed in either situation, all relays 71, 73, 75, 83, 85, 87 are de-energized to prevent overheating of spinner 35 or overloading of the electrical system of aircraft 11. If no current is sensed in these situations, then controller 47 continues normal operation of heating elements 39.

All of feed relays 71, 73, 75, and control relays 83, 85, 87 are energized during normal operation of heating elements 39, and controller 47 preferably cycles operation of heating elements 39 by selectively de-energizing feed relays 71, 73, 75, and control relays 83, 85, 87. During operation of heating elements 39, the current in any conductor 77, 79, 81 or any leg of the delta configuration should remain within a selected range of values, though an undercurrent fault is simply reported while normal operation continues. If an overcurrent fault is detected in one zone of heating elements 39, then control relays 83, 85, 87 are de-energized to isolate the fault in spinner 35 and allow for heating elements 41 in blades 23 to continue in operation.

FIG. 7 is a schematic view of the control system for heating elements 41 in blades 23. Feed relays 71, 73, 75, which are preferably solid-state, single-pole relays, control the flow of electrical current through conductors 77, 79, 81 to heating elements 41 and heating elements 39 in spinner 35. All corresponding zones of heating elements 41 for the three blades 23 are operated simultaneously and configured in a "delta" arrangement. Each BDD 33 carries a solid-state, single-pole control relay 95 for each heater zone of the corresponding blade 23, such that the number of control relays 95 in each BDD 33 is the same as the number of heater zones on blades 23. In the embodiment shown, this means that BDD 33 for each blade 23 has nine control relays 95. Controller 27 can signal controller 47 in NCU 29 to operate heating elements 41, and this is accomplished by controller 47 energizing feed relays 71, 73, 75, and control relays 95 in each BDD 33 for the selected heating zone, allowing electrical power to flow through conductors 77, 79, 81 to heating elements 41. Control signals from controller 47 are carried to CDD 31 on cable 97 and from CDD 31 to each BDD 33 on cable 99. The rotating and non-rotating portions of cable 97 are conductively connected through slip ring 67.

Fault detection and isolation is accomplished in the same manner as described above for spinner 35. Sensors 69 detect current in conductors 77, 79, 81, allowing for detection of undercurrent and overcurrent faults when feed relays 71, 73, 75, and control relays 95 (switched together for each zone) are in selected relay states.

All of feed relays 71, 73, 75, and control relays 95 for a particular heater zone are energized during normal operation of heating elements 41 in that zone, and controller 47 preferably cycles operation of heating elements 41 by selectively de-energizing control relays 95 and/or feed relays 71, 73, 75. Operation of heating elements 41 may be scheduled for ambient conditions and/or the current flight profile (airspeed, etc.) of aircraft 11.

As for the ice-management devices described above, the amount of current flowing to each heater zone should remain within a selected range during normal operation. It is especially important that the current in conductors 77, 79, 81 or any leg of the delta configuration remain below a selected value, in that overheating of a portion of blade 23 may lead to catastrophic failure of blade 23 and loss of aircraft 11. If an overcurrent fault is detected in one of the legs of the delta configuration, then control relays 95 for that blade heater zone are de-energized to isolate the fault in that zone and allow for the other heater zones and heating elements 39 of spinner 35 to continue in operation. Undercurrent detection is also very important to prevent accumulated ice from melting too slowly, which may allow refreezing on the trailing edge of blades 23 rather than the ice being cleanly shed from blades 23.

Current sensors 69 of system 25 sense only the magnitude of the current within each associated conductor and do not sense the phase angle. To calculate the phase current amplitudes within a 3-phase delta load, a new mathematical technique is implemented in software that facilitates this calculation when only the magnitudes of the line currents are known. Calculating phase currents within a 3-phase delta load normally requires measuring both the magnitude and phase angles of all 3 line currents. The method of the invention allows calculation of the phase current magnitudes without having to measure the line current phase angles, saving cost, weight, and space within the associated electronic hardware.

Figure 8:
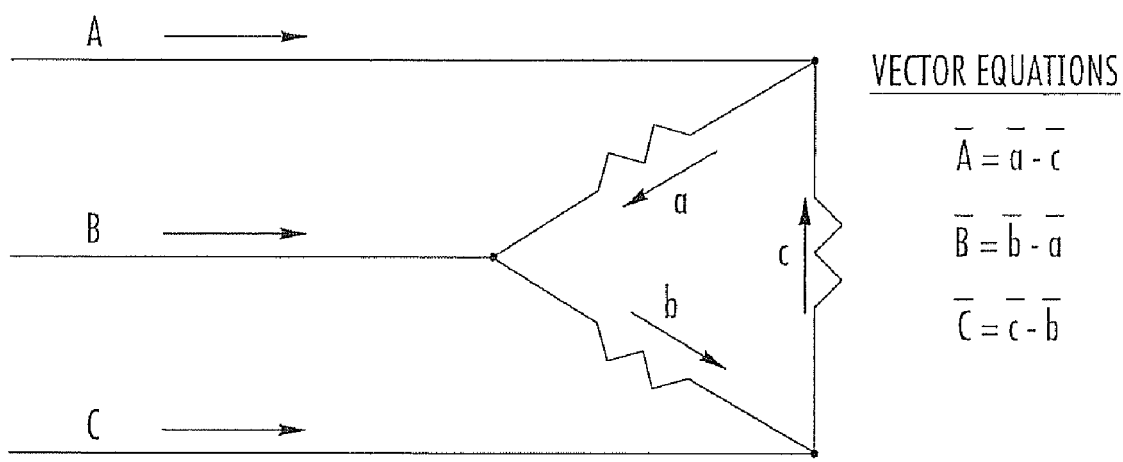
FIG. 8 is a schematic view of an example 3-phase electrical load in a delta configuration.

FIG. 8 shows an example delta load comprising electrical loads a, b, and c connected to a 3-phase electrical source producing line currents labeled A, B, and C. The standard vector equations for currents in this system are:

$$\overline{A} = \overline{a} - \overline{c},$$

$$\overline{B} = \overline{b} - \overline{a}, \text{ and}$$

$$\overline{C} = \overline{c} - \overline{b}$$

Figure 9:
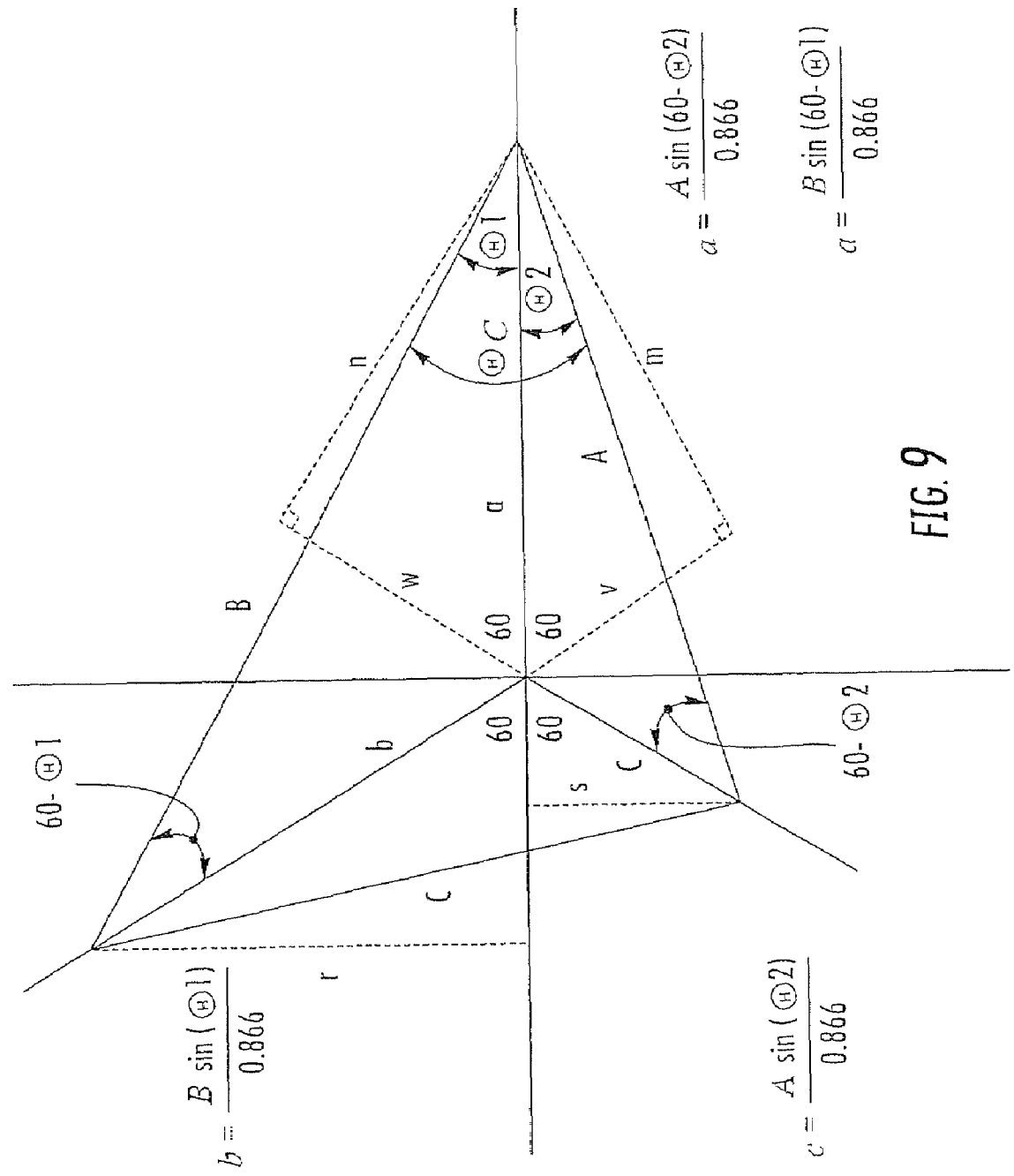
FIG. 9 is a vector diagram for the delta configuration of FIG. 8.

FIG. 9 is a vector diagram based on these vector equations and using arbitrary values for A, B, and C. The diagram is drawn on an x-y coordinate system and depicts the vector relationship between the line currents A, B, and C and the load currents a, b, and c. The load currents are always 120 degrees apart and their magnitude defines the magnitude and angle of the line currents. Even if the angles of the line currents are not measured unknown, it is well understood that the vertices of the triangle formed by the line-current magnitudes must define the end points of the 3-phase currents originating from the origin of the x-y system.

Given the geometric representation in FIG. 9, the magnitude of the phase currents can be calculated as follows. In the calculations, angles are expressed in degrees, and it should be noted that $\sqrt{3}/2$ is rounded off to 0.866 for notational purposes.

Side m is the opposite side of the triangle defined by B, b, v, and m, and $$m = B \sin(60 - \Theta_1)$$

Side m is also the opposite side of the fixed 60-deg triangle defined by a, v, and m, so $$a = \frac{m}{\sin 60} = \frac{B \sin(60 - \Theta_1)}{0.866} \quad (1)$$

Because r is the opposite side of the triangle defined by B and r, and the portion of the x-axis connecting B to r to form a right triangle, then $$r = B \sin(\Theta_1)$$

Side r is also the opposite side of the fixed 60-deg triangle defined by r and b and the portion of the x-axis connecting r to b, so it follows that $$b = \frac{r}{\sin 60} = \frac{B \sin(\Theta_1)}{0.866} \quad (2)$$

Side s is the opposite side of the triangle defined by A, a, s and the portion of the x-axis connecting s to the origin to form a right triangle, therefore $$s = A \sin(\Theta 2)$$

Because s is also the opposite side of the fixed 60-deg triangle defined by c, s and the portion of the x-axis connecting s to the origin to form a 60-degree right triangle, it is true that $$c = \frac{s}{\sin 60} = \frac{A\sin(\Theta_2)}{0.866} \quad (3)$$

Equations (1), (2), and (3) are equations for the magnitude of the 3-phase load currents expressed in terms of the magnitude of two of the line currents and the angles $\Theta_1$ and $\Theta_2$. It should be noted that line current C has not been used thus far. It is also necessary to determine $\Theta_1$ and $\Theta_2$, which will include dependence on line magnitude C.

First, angle $\Theta_c$ is calculated using the Law of Cosines as $$C^2 = A^2 + B^2 - 2AB\cos\Theta_c \quad (4)$$

$$\cos\Theta_c = \frac{A^2 + B^2 - C^2}{2AB}$$

$$\Theta_c = \cos^{-1}\left(\frac{A^2 + B^2 - C^2}{2AB}\right)$$

Since $\Theta_c = \Theta_1 + \Theta_2$, it follows that $$\Theta_1 = \Theta_c - \Theta_2 \quad (5)$$

$$\Theta_2 = \Theta_c - \Theta_1$$

Thus, the value for $\Theta_c$ is known, but the values for $\Theta_1$ and $\Theta_2$ still need to be determined. In order to do this, an equation is written for the amplitude of phase current a, such that it is a function of $\Theta_2$. Since n is the opposite side of the triangle defined by A, c, w, and n, it follows that $$n = A\sin(60 - \Theta_2)$$

Since n is also the opposite side of the fixed 60-deg triangle defined by a, w, and n, then $$a = \frac{n}{\sin 60} = \frac{A\sin(60 - \Theta_2)}{0.866}$$

The two equations for a can then be set as equal and solved by substitution of $\Theta_2 = \Theta_c - \Theta_1$ $$a = \frac{A\sin(60 - \Theta_2)}{0.866} = \frac{B\sin(60 - \Theta_1)}{0.866}$$

$$A\sin(60 - \Theta_c + \Theta_1) = B\sin(60 - \Theta_1)$$

If a substitution is made wherein $K = 60 - \Theta_c$, then $$A\sin(K + \Theta_1) = B\sin(60 - \Theta_1)$$

Using the identity $\sin(x \pm y) = \sin x \cos y \pm \cos x \sin y$, it follows that $A[\sin K \cos \Theta_1 + \cos K \sin \Theta_1] = B[\sin(60)\cos \Theta_1 - \cos(60)\sin \Theta_1]$ $A[\sin K \cos \Theta_1 + \cos K \sin \Theta_1] = B[0.866 \cos \Theta_1 - 0.5 \sin \Theta_1]$ Separating sines and cosines results in the following:

$$[A\sin K - 0.866B]\cos\Theta_1 = [-A\cos K - 0.5B]\sin\Theta_1$$

$$\frac{[A\sin K - 0.866B]}{[-A\cos K - 0.5B]} = \frac{\sin\Theta_1}{\cos\Theta_1}$$

Using the identity $$\tan x = \frac{\sin x}{\cos x},$$

the equation becomes $$\tan\Theta_1 = \frac{[A\sin K - 0.866B]}{[-A\cos K - 0.5B]}$$

and therefore $$\Theta_1 = \tan^{-1}\frac{[A\sin K - 0.866B]}{[-A\cos K - 0.5B]} \quad (6)$$

Given the equations above, the magnitudes of the phase currents can be solved as follows:
 1) Solve for $\Theta_c$ using equation (4).
 2) Solve for $\Theta_1$ using equation (6).
 3) Solve for $\Theta_2$ using equation (5).
 4) Solve for the three phase current magnitudes using equations (1), (2), and (3).

While this invention has been described with reference to an illustrative embodiment, this description is not intended to be construed in a limiting sense. Various modifications and other embodiments of the invention will be apparent to persons skilled in the art upon reference to the description.

The invention claimed is:

1. An ice management system for an aircraft having at least one rotor, each rotor having a plurality of blades, the system comprising:
 an electrical power supply adapted to be carried by the aircraft remote from the rotor;
 at least one heater carried by the rotor for heating at least a portion of the rotor;
 a plurality of solid-state control relays, the plurality of solid-state control relays including a first solid-state control relay carried by the rotor and conductively coupled between the power supply and the at least one heater for selectively controlling a flow of electrical power from the power supply to the at least one heater, wherein the plurality of solid-state control relays includes a second control relay in series with the first control relay; and
 a solid-state feed relay adapted to be carried by the aircraft remote from the rotor, the feed relay being conductively coupled between the power supply and the at least one heater,
 wherein the solid-state feed relay is connected in series with the first and second control relays and configured for selectively controlling a flow of electrical power to the control relays, and wherein the at least one heater is connected in series between the solid-state feed relay and one of the first and second control relays.

2. The ice management system according to claim 1, wherein the at least one heater comprises at least one heater located on each blade.

3. The ice management system according to claim 1, wherein the flow of electrical power is conducted to at least one of the plurality of control relays through a slip ring carried on the rotor.

4. An ice management system for an aircraft having at least one rotor, each rotor having a plurality of blades, the system comprising:
   an electrical power supply adapted to be carried by the aircraft, the power supply being carried remote from each rotor and being conductively connected provide a plurality of phases of electrical power;
   a plurality of heaters located on each blade, each heater for heating at least a respective portion of the corresponding blade; and
   a plurality of solid-state control relays, each solid-state control relay being operably associated with a respective heater, each control relay being carried in the rotor and conductively connected to receive a respective phase of electrical power from the electrical power supply between the electrical power supply and the corresponding heater and for selectively controlling a flow of current therebetween; and
   a solid-state feed relay located remote from the rotor, the feed relay being conductively connected between the power supply and at least one of the solid-state control relays for selectively controlling a flow of current therebetween.

5. The ice management system according to claim 4, wherein the flow of electrical power is conducted through a slip ring carried on the rotor.

6. The ice management system according to claim 1, comprising:
   a plurality of heaters, including the at least one heater, carried by the rotor for heating respective portions of the rotor,
   wherein each control relay is carried by the rotor and conductively coupled between the power supply and a respective heater for selectively controlling the flow of electrical power from the power supply to the respective heater; and
   a controller configured for controlling the control relays and the feed relay such that electrical power is independently controlled to each heater.

7. The ice management system according to claim 6, further comprising:
   a current sensor for sensing an amount of electrical current in a current path that is controlled by the feed relay and at least one of the control relays,
   wherein the controller is further configured for determining whether to disable the ice management system based on the amount of electrical current sensed by the sensor.

8. The ice management system according to claim 1, wherein the plurality of solid-state control relays includes a third control relay in series with the first and second control relays.

9. The ice management system according to claim 8, wherein the first control relay is operable for controlling electrical current between the second and third control relays, the second control relay is operable for controlling electrical current between the first and third control relays, and the third control relay is operable for controlling electrical current between the first and second control relays.

10. The ice management system according to claim 4, further comprising a controller configured for controlling the control relays and the feed relay such that electrical power is independently controlled to each heater.

11. The ice management system according to claim 10, further comprising:
   a current sensor for sensing an amount of electrical current in a current path that is controlled by the feed relay and at least one of the control relays,
   wherein the controller is further configured for determining whether to disable the ice management system based on the amount of electrical current sensed by the sensor.

12. The ice management system according to claim 4, wherein the plurality of control relays includes at least two control relays connected in series.

13. The ice management system according to claim 4, wherein the plurality of control relays includes first, second, and third control relays, wherein the first control relay is operable for controlling electrical current between the second and third control relays, the second control relay is operable for controlling electrical current between the first and third control relays, and the third control relay is operable for controlling electrical current between the first and second control relays.

* * * * *

UNITED STATES PATENT AND TRADEMARK OFFICE
CERTIFICATE OF CORRECTION

PATENT NO. : 7,604,202 B2  
APPLICATION NO. : 11/662859  
DATED : October 20, 2009  
INVENTOR(S) : Gary S. Froman Page 1 of 1

It is certified that error appears in the above-identified patent and that said Letters Patent is hereby corrected as shown below:

In the Specification:

In column 1, after the Title and before the heading "TECHNICAL FIELD", insert:

--Government License Rights  
This invention was made with government support under contract numbers N00019-93-C-0006, N00019-96-C-0054, N00019-99-C-1090, and N00019-00-C-0183.--

Signed and Sealed this  
Fourth Day of June, 2013

Teresa Stanek Rea  
*Acting Director of the United States Patent and Trademark Office*